US006897383B2

(12) United States Patent
Larkin

(10) Patent No.: US 6,897,383 B2
(45) Date of Patent: May 24, 2005

(54) ELECTRICAL CABLE MOISTURE BARRIER

(75) Inventor: Kevin B. Larkin, Pebble Beach, CA (US)

(73) Assignee: Westek Electronics, Inc., Santa Cruz, CA (US)

( * ) Notice: Subject to any disclaimer, the term of this patent is extended or adjusted under 35 U.S.C. 154(b) by 225 days.

(21) Appl. No.: 10/251,904

(22) Filed: Sep. 19, 2002

(65) Prior Publication Data

US 2004/0056671 A1 Mar. 25, 2004

(51) Int. Cl.[7] .......................... H02G 15/007; F16L 5/02

(52) U.S. Cl. ................. 174/135; 174/66 SS; 174/74 R; 277/607

(58) Field of Search ........................... 174/66 SS, 74 R, 174/135; 277/602, 606, 607

(56) References Cited

U.S. PATENT DOCUMENTS

| | | | | | |
|---|---|---|---|---|---|
| 3,978,581 A | | 9/1976 | Miura | ......................... | 29/630 |
| 4,486,540 A | * | 12/1984 | Brewer et al. | .............. | 436/513 |
| 4,659,164 A | * | 4/1987 | Reuss | ......................... | 439/607 |
| 5,280,774 A | | 1/1994 | Entenmann et al. | ........ | 123/457 |
| 5,396,572 A | * | 3/1995 | Bradley et al. | ............... | 385/78 |
| 5,691,505 A | * | 11/1997 | Norris | ......................... | 174/51 |
| 5,713,748 A | * | 2/1998 | Mulvihill | ..................... | 439/98 |
| 5,724,730 A | * | 3/1998 | Tanaka | ........................ | 174/76 |
| 5,926,952 A | | 7/1999 | Ito | ............................. | 29/883 |
| 6,257,920 B1 | * | 7/2001 | Finona et al. | ............... | 439/455 |
| 6,344,614 B1 | * | 2/2002 | Sutehall et al. | ........... | 174/74 R |
| 6,386,895 B1 | * | 5/2002 | Rehrig | ....................... | 439/191 |
| 6,426,462 B1 | * | 7/2002 | Mignon et al. | ........... | 174/65 R |
| 6,482,034 B2 | * | 11/2002 | Ozaki | ......................... | 439/585 |
| 6,504,099 B2 | * | 1/2003 | Huang | ...................... | 174/74 R |
| 6,573,454 B2 | * | 6/2003 | Fujiwara | ................... | 174/74 R |

* cited by examiner

*Primary Examiner*—Dean A. Reichard
*Assistant Examiner*—Adolfo Nino
(74) *Attorney, Agent, or Firm*—Johannes Schneeberger

(57) ABSTRACT

A moisture barrier is molded and/or glued around an exposed section of a conductor where a surrounding insulation layer is removed. A gap between the conductor and a surrounding insulation layer consequently terminates at the moisture barrier and moisture is prevented from creeping any further. The moisture barrier is preferably integrated in a wick dam of a test cord utilized in a telephone line-testing device.

14 Claims, 6 Drawing Sheets

ELECTRICAL CABLE MOISTURE BARRIER

FIELD OF INVENTION

The present invention relates to moisture barriers of electrical cables. More particular, the present invention relates to a combined moisture barrier and strain relief of an electrical test cord.

BACKGROUND

Corrosion of metallic conductors due to moisture is a well-known problem in electrical applications. Metal oxides that result from the corrosion have typically relatively low conductivity. In cases, where electricity is transmitted via mechanically connected conductors, moisture may cause the formation of insulating oxide layers in the interface of the conductors. In such cases, an unfavorable electrical resistance degrades the conductive path across the interface.

Moisture is a particular problem in the field of telephone line testing where precise measurements need to be taken under partially severe weather conditions. Measurement devices are thereby exposed to a variety of operational conditions including sudden temperature changes, rain, snow, sleet, etc. The measurement devices need to be configured to provide continuous measurement precision under such operational conditions.

A main part of electrical measurement devices is the test cord that commonly includes two separate cables that are connected with one end on terminals of the measurement device. The other ends are designed for a temporary connection with contacts at which measurements need to be performed. In applications such as telephone line testing devices, the test cable terminals are commonly within a hermetically sealed housing.

The individual cables of a test cord are usually made of tinsel wire at the ends of which lugs are crimped on to reliably connect the cables to the device's terminals. It has been observed that despite careful sealing of the device housing, corrosion still occurs inside the housing at the interface between the crimped lugs and the tinsel wire. This corrosion is particularly undesirable since it may impose a resistance in the test cord that degrades the over all measurement precision of the device. Therefore, there exists a need for a test cord that is configured to prevent moisture related corrosion in the interface between the crimped lugs and the tinsel wire. The present invention addresses this need.

Efficient mass production of electrical components often includes plastic molding. In so-called inserter molds conductors are placed together with eventual other prefabricated parts and a plastic material is molded around them. For example, U.S. Pat. No. 3,978,581 to Miura discloses a method of making a pin plug that involves the insert molding of a housing whereby pins and cables are fixedly embedded. The molded plastic provides thereby electrical insulation and structural support.

Similarly, U.S. Pat. No. 5,724,730 to Tanaka claims a method for protecting a conductive part of a flat cable. The conductors of a flat cable are inserted thereby together with the connected relay wires in a mold and a housing is molded around them that provides similarly to Miura electrical insulation and structural support.

In the U.S. Pat. No. 5,926,952 to Ito a pre-molded connector structure is provided that includes a core structure that fixedly holds a number of conductors that protrude all the way through the core structure. The core structure is made of plastic and provides structural support and electrical insulation.

Finally, in U.S. Pat. No. 5,780,774 to Ichikawa et al. a connector structure is disclosed, in which independent connectors are fixed in a conductive connection by molding an upper portion onto a prefabricated housing base. Again, the molding provides structural support and electrical insulation.

SUMMARY

A discovered pathway for moisture is the gap between the conductive core and the surrounding insulation of an electric cable. In the case of a test cord, moisture may creep along this pathway from the peripheral contacts into the sealed housing of the measurement device where the conductors of the test cord terminate.

In the present invention, a barrier is molded along an exposed section of a cable such that a gap between the conductive core and the cable's insulation is interrupted. As a result, moisture may propagate along the gap only up to the molded barrier. The moisture barrier is preferably incorporated in cables exposed to severe operational conditions, as is the case for test cords of telephone line-testing devices.

The test cord is an independently fabricated component that is typically assembled in the measurement device before the device housing is put together. The test cord has an enlarged section commonly called wick dam. The wick dam fits with its outside shape into correspondingly shaped material separations of the device housing. Thus, when the test cord is assembled, the wick dam snuggly fits and seals the hole through which the test cord's cable strings reach into the device housing. The wick dam is commonly molded or glued around the cable strings to provide structural support and to prevent cable damage.

Even though in prior art test cords, the housing opening is usually hermetically sealed by the wick dam, moisture may still creep along a gap between the cable strings' core and its surrounding insulation. In the present invention, the moisture barrier interrupts this remaining pathway. The moisture barrier is provided within the wick dam by removing the insulation layer along a certain length of the cable strings and consecutively embedding the exposed section directly in the wick dam. The molded and/or glued material of the wick dam snuggly surrounds the core such that the gap between the insulation and the core terminates within the enlarged section.

Eventually, metal sleeves are crimped adjacent to the exposed section to provide a strain relief for the exposed section. Once the enlarged section is formed the metal sleeves are fixedly held within the enlarged section. Tensile and/or bending forces applied on the outside portion of the test cord are transmitted via the crimped sleeves onto the enlarged section and the device housing.

DETAILED DESCRIPTION

Figure 1:
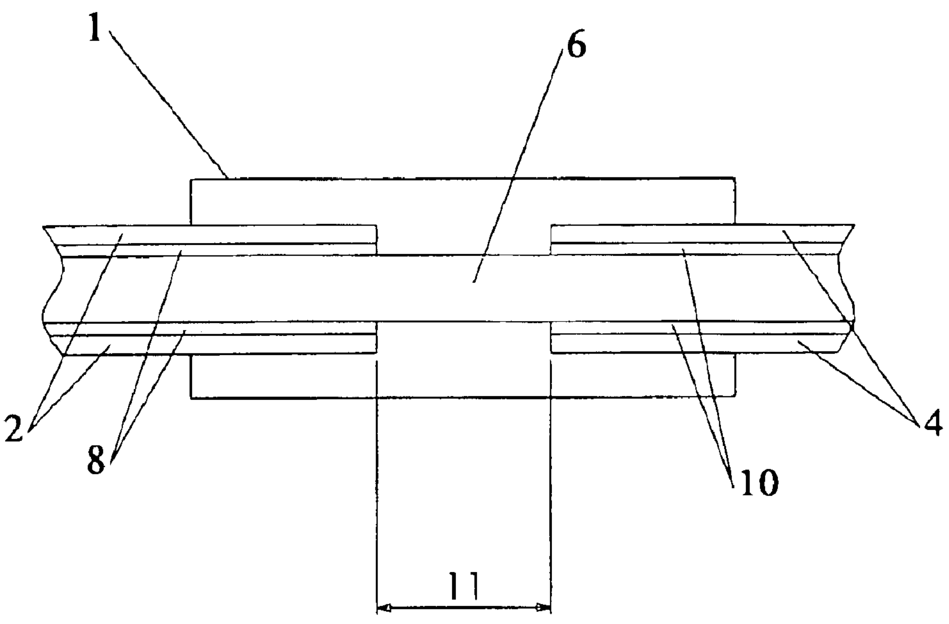
FIG. 1 shows a schematic section view of a basic configuration of the enlarged section.

Referring to FIG. 1, a basic embodiment of a moisture barrier in accordance with the present invention is described. Layers 2 and 4 may surround a core 6. Between the surrounding layers 2, 4 and the core 6 may be a gap 8, 10. Moisture may be present in gap 8. Along an exposed core section 11 a molded housing 1 encapsulates snuggly the core 6 such the gap 8, 10 terminate at the boundaries of the exposed section 11. The moisture barrier is configured such that no moisture may reach gap 10. The core 6 is preferably a metallic conductor and the surrounding layers 2 and 4 are well-known non conductive insulation materials used for cable insulation.

It is noted that the gap 8 and/or 10 may have any configuration allowing moisture to creep along it. This may be also the case where the insulation layer 2 and/or 4 contact the core 6 and/or the core layer 7 (see FIGS. 2, 3, 4).

Figure 2:
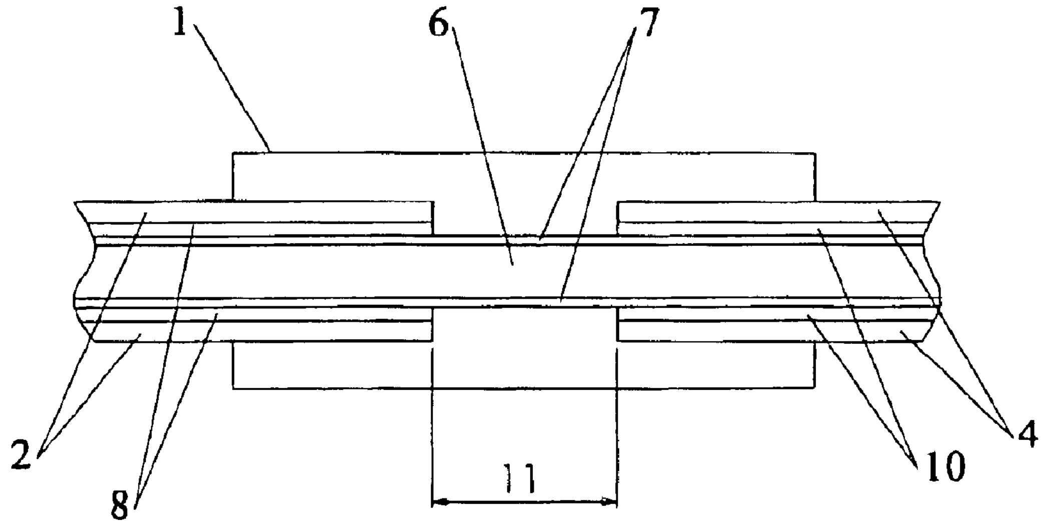
FIG. 2 depicts a schematic section view according to FIG. 1 with the core having a core layer continuing along the exposed section.

Now turning to FIG. 2 an embodiment is described where the core 6 has a core layer 7. As can be seen, the core layer 7 continues along the exposed section 11 and provides an uninterrupted coating of the core 6. The housing 1 snuggly contacts the layer 7 along the exposed section 11. A layer 7 may be utilized in cases where the core 6 includes a number of conductors as is in the case of tinsel wire.

Figure 3:
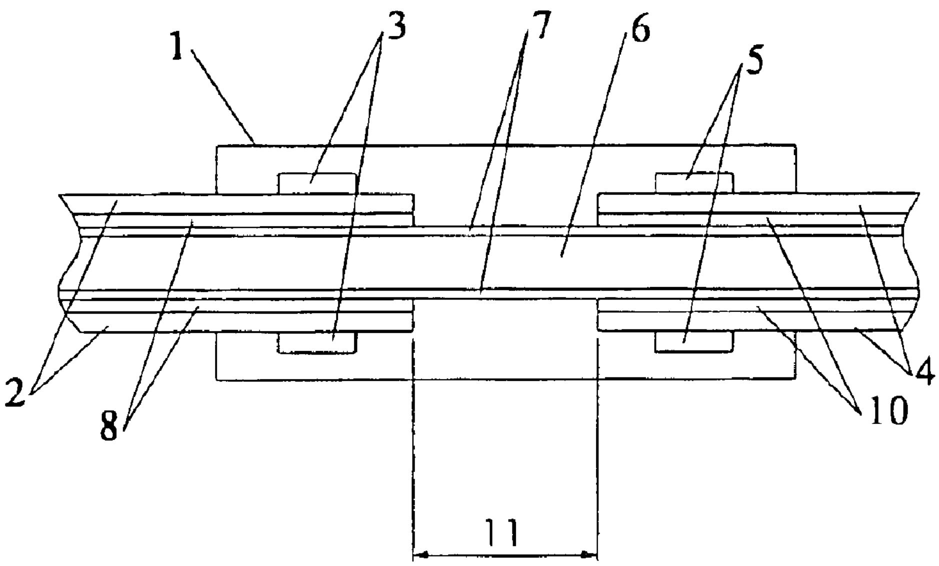
FIG. 3 illustrates a schematic section view according to FIG. 2 with additional crimped sleeves placed lateral of the exposed section.

In the embodiments of FIGS. 1 and 2, the molded housing 1 mainly operates as a moisture barrier. In FIG. 3 an embodiment is depicted where the molded housing 1 additionally provides structural support. For that purpose, metal sleeves 3, 5 are crimped around the surrounding layers 2, 4 in a well-known fashion. The sleeves 3, 5 fixedly hold on to the surrounding layers 2, 4. The housing 1 is molded around the sleeves 3, 5. As a result, externally imposed strain is transmitted via the sleeves 3 and/or 5 onto the housing 1 and the exposed section 11 may remain free of mechanical stress.

Figure 4:
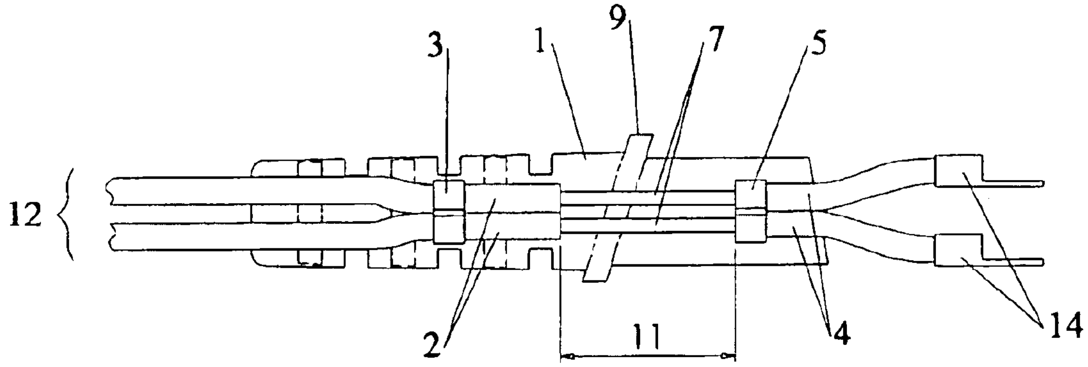
FIG. 4 shows an exemplary configuration of the extended section.

In FIG. 4, an embodiment is illustrated in which the molded housing 1 is additionally configured as a well-known wick dam. Thereby, the exposed section 11 is placed at the rigid portion of the wick dam. As can be seen in FIG. 4, the rigid portion may feature a flange section 9 that interlocks with a correspondingly shaped opening of a device housing 20 (see FIG. 6). FIG. 4 also shows crimped lugs 14, which may be connected to internal terminals of a measurement device. The moisture barrier prevents moisture eventually present between the core layer 7 and the surrounding layer 2 from reaching the crimped lugs 14.

The surrounding layers 2 and 4 may be made of braded nylon or any other well-known plastic that may be used for electrical insulation. The core layer 7 may be of a plastic material commonly traded under the name “Teflon”. With a heatstripper or any other suitable tool the surrounding layer 2, 4 are cut at the boundary of the exposed section 11. The use of a heatstripper prevents damage of the core layer 7, which has a significantly higher melting point than the outside layers 2, 4. In that way damage to the core layer 7 and an unintentional moisture bridge between core 6 and core layer 7 is avoided.

Once the exposed section 11 is prepared and the sleeves 3, 5 are crimped on, the cable string 12 is inserted in a mold and the housing 1 is molded in a well-known fashion. An exemplary material of housing 1 may be polyvinyl chloride traded under the name “PVC”. The housing 1 may be also fabricated from two separately molded halves that are fused together. The two halves may be potted and/or sealed with a curing resin and/or an insulating liquid. The two halves may feature a well-known snapping mechanism for holding them together.

The placement of the sleeves 3, 5 on both sides of the exposed section 11 uniquely divides tensile strain onto the sleeves 3, 5. This is possible, since the surrounding layer 2 is physically disconnected from the surrounding layer 4. Hence, the sleeve 3 transmits mainly strain from the surrounding layer 2 onto the housing 1, whereas the sleeve 5 transmits mainly externally induced strain from the core 6 via the layer 4 onto the housing 1. This is particularly advantageous in reducing the risk of ripping the layer 2.

Figure 5:
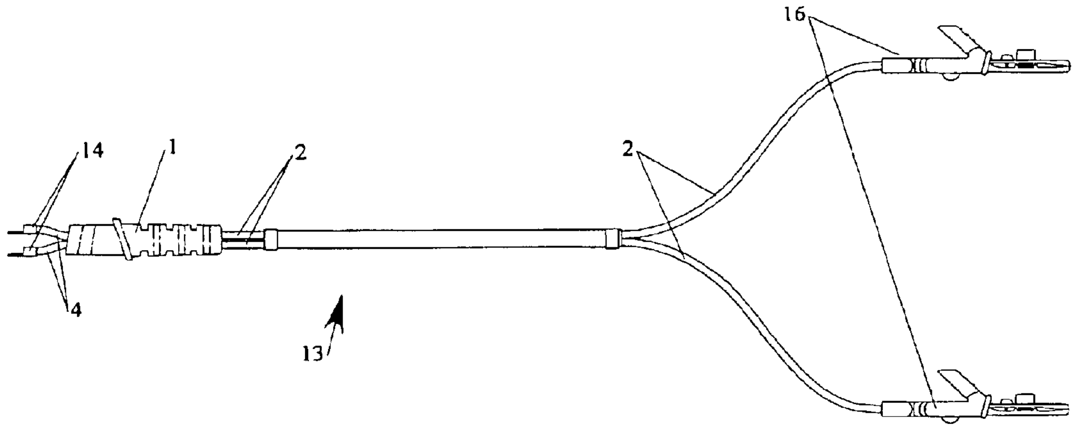
FIG. 5 depicts an exemplary test cord.

FIG. 5 shows a final test cord 13 with the housing 1 in the configuration of a wick dam. The test cord 13 has clamps 16 on the outside cable ends. The clamps 16 provide temporary connection to test contacts at which measurements need to be performed. Moisture may enter the gap 8 where the clamps are attached at their respective cores 6.

Figure 6:
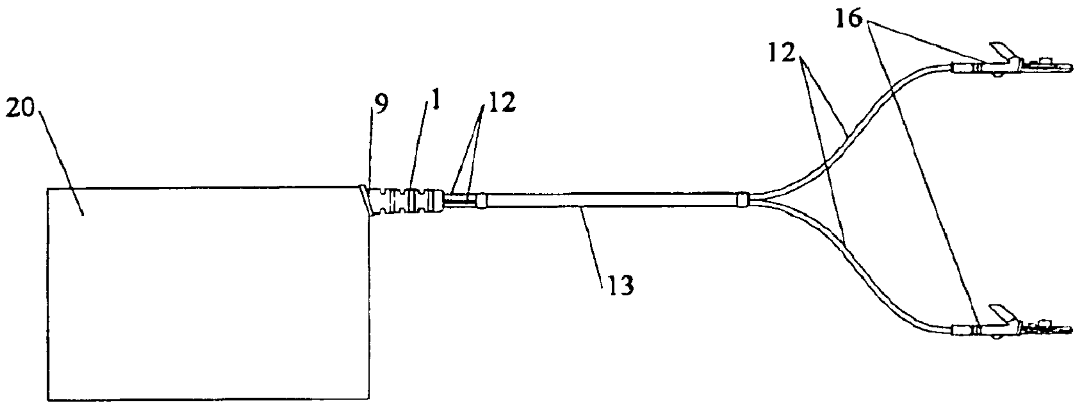
FIG. 6 illustrates a measurement device having a test cord of the present invention.

In FIG. 6, the test cord 13 is shown assembled together with a device housing 20 of a well-known measurement device.

Accordingly, the scope of the invention described in the specification above is set forth by the following claims and their legal equivalent:

What is claimed is:

1. A moisture barrier for preventing moisture from propagating beyond a gap between a core and a surrounding layer, said moisture barrier comprising a molded housing snuggly encompassing an exposed core section where said surrounding layer is removed, further comprising a first crimping means fixedly crimped on said surrounding layer next to said exposed core section such that a first force externally applied on said insulation layer is transmitted via said crimping means onto said molded housing.

2. A moisture barrier for preventing moisture from propagating beyond a gap between a core and a surrounding layer, said moisture barrier comprising a molded housing snuggly encompassing an exposed core section where said surrounding layer is removed, further comprising a second crimping means fixedly crimped on an additional insulation layer next to said exposed core section and opposing said surrounding layer such that a second force externally applied on said core layer is transmitted via said additional insulation layer and said second crimping means onto said molded housing.

3. A moisture barrier for preventing moisture from propagating along a gap between a core and a surrounding layer, said moisture barrier comprising:

a. two crimping means fixedly crimped on said surrounding layer next to an exposed core section along which said surrounding layer is removed such that a first force externally applied on said insulation layer is transmitted via a first of said two crimping means onto said molded housing and such that a second force externally applied on said core layer is transmitted via a second of said two crimping means onto said molded housing; and b. a molded housing snuggly holding said exposed core section and said two crimping means such that said exposed core section is strain relieved via said two crimping means and said molded housing.

4. The moisture barrier of claim 3, wherein said core includes an electrical conductor and said surrounding layer includes an electrical insulator.

5. The moisture barrier of claim 4, wherein said core further includes a core layer surrounding said conductor.

6. The moisture barrier of claim 3, wherein said molded housing is a wick dam configured for fitting into a correspondingly shaped portion of a device housing such that one end of said conductor terminates inside said device housing and such that the other end of said conductor terminates outside said device housing.

7. The moisture barrier of claim 6, wherein said moisture barrier, said conductor and said wick dam are part of an electric test cord.

8. The moisture barrier of claim 7, wherein said device housing is part of an electrical testing device.

9. A test cord comprising:

a. an electrical conductor configured for transmitting a voltage from a peripheral contact to an electrical terminal of an electrical device;

b. an insulator layer surrounding said conductor between said peripheral contact and one end of an exposed core section;

c. a molded housing snuggly encompassing said exposed core section such that a gap between said conductor and said insulator layer terminates at said molded housing and such that moisture eventually present in said gap is prevented from propagating beyond said gap towards said terminal; and wherein said molded housing is part of a wick dam that snuggly seals a correspondingly shaped opening of said electrical device.

10. The test cord of claim 9, further comprising two crimping means fixedly crimped on said surrounding layer next to said exposed core such that a first force externally applied on said insulation layer is transmitted via a first of said two crimping means onto said molded housing and such that a second force externally applied on said core layer is transmitted via a second of said two crimping means onto said molded housing.

11. The test cord of claim 9, wherein said device housing is part of an electrical testing device.

12. An electrical testing device comprising:

a. a device housing having an opening for accessing internal terminals;

b. a test cord comprising:

i. an electrical conductor configured for transmitting a voltage from a peripheral contact to an electrical terminal of an electrical device;

ii. an insulator layer surrounding said conductor between said peripheral contact and one end of an exposed core section; and iii. a wick dam snuggly encompassing said exposed core section such that a gap between said conductor and said insulator layer terminates at said molded housing and such that moisture eventually present in said gap is prevented from propagating beyond said gap towards said terminal, wherein said wick dam has an outside shape that is snuggly held in said opening.

13. The testing device of claim 12 being a telephone line-testing device.

14. The electrical testing device of claim 12, further comprising two crimping means fixedly crimped on said surrounding layer next to said exposed core such that a first force externally applied on said insulation layer is transmitted via a first of said two crimping means onto said molded housing and such that a second force externally applied on said core layer is transmitted via a second of said two crimping means onto said molded housing.

* * * * *